United States Patent
Ruwisch et al.

(10) Patent No.: US 6,858,193 B2
(45) Date of Patent: Feb. 22, 2005

(54) CATALYST FOR LOWERING THE AMOUNT OF NITROGEN OXIDES IN THE EXHAUST GAS FROM LEAN BURN ENGINES

(75) Inventors: Lutz Marc Ruwisch, Darmstadt (DE); Ulrich Göbel, Hattersheim (DE); Juliane Theis, Karlstein (DE); Rainer Domesle, Alzenau-Kälberau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 10/306,675

(22) Filed: Nov. 27, 2002

(65) Prior Publication Data

US 2003/0125202 A1 Jul. 3, 2003

(30) Foreign Application Priority Data

Nov. 30, 2001 (EP) .............................. 01128599

(51) Int. Cl.[7] .......................... B01J 21/04; B01J 21/10; B01J 23/02; B01J 23/10; B01J 23/40
(52) U.S. Cl. .................... 423/213.5; 502/302; 502/303; 502/304; 502/328; 502/330; 502/332; 502/334; 502/339; 502/340; 502/341; 502/344; 502/355
(58) Field of Search ................................ 502/302, 303, 502/304, 328, 330, 332, 333, 334, 339, 340, 341, 344, 355; 423/213.5

(56) References Cited

U.S. PATENT DOCUMENTS

| | | | | |
|---|---|---|---|---|
| 3,990,998 A | | 11/1976 | DeLuca et al. | |
| 4,239,656 A | * | 12/1980 | Fujitani et al. | 502/200 |
| 4,274,981 A | * | 6/1981 | Suzuki et al. | 502/178 |
| 4,883,783 A | * | 11/1989 | Burk et al. | 502/304 |
| 5,817,596 A | * | 10/1998 | Akporiaye et al. | 502/327 |
| 6,313,063 B1 | * | 11/2001 | Rytter et al. | 502/327 |
| 6,338,831 B1 | * | 1/2002 | Strehlau et al. | 423/244.07 |
| 6,350,421 B1 | * | 2/2002 | Strehlau et al. | 423/213.2 |
| 6,372,688 B1 | * | 4/2002 | Yamashita et al. | 502/326 |

FOREIGN PATENT DOCUMENTS

| | | |
|---|---|---|
| EP | 0 645 171 A | 3/1995 |
| EP | 0 890 389 A | 1/1999 |
| EP | 0945 165 A | 9/1999 |
| EP | 0 982 066 A | 3/2000 |

OTHER PUBLICATIONS

European Search Report, OMG AG & Co. KG, Feb. 6, 2003.

* cited by examiner

*Primary Examiner*—Christina Ildebrando
(74) *Attorney, Agent, or Firm*—Kalow & Springut LLP

(57) ABSTRACT

The invention relates to a catalyst for lowering the amount of $NO_x$ in the lean exhaust gas from lean burn engines, comprising active aluminum oxide, magnesium oxide and at least one noble metal of the platinum group of the periodic table of the elements, as well as at least one nitrogen oxide storage material. The catalyst is characterized in that the magnesium oxide forms a homogeneous mixed oxide with aluminum oxide and is present in a concentration of about 1 to about 40 wt.-%, based on the total weight of the mixed oxide.

24 Claims, 8 Drawing Sheets

CATALYST FOR LOWERING THE AMOUNT OF NITROGEN OXIDES IN THE EXHAUST GAS FROM LEAN BURN ENGINES

FIELD OF THE INVENTION

The present invention relates to a catalyst for lowering the amount of nitrogen oxides in the exhaust gas from lean burn engines. The catalyst comprises aluminum oxide, magnesium oxide and at least one nitrogen oxide storage material as well as at least one noble metal from the platinum group of the periodic table of elements.

BACKGROUND OF THE INVENTION

In the field of gasoline engines, so-called lean burn engines have been developed in order to reduce fuel consumption, which are fueled with lean air/fuel mixtures when operating under partial load. A lean air/fuel mixture contains a higher concentration of oxygen than necessary for complete combustion of the fuel. The corresponding exhaust gases then contain an excess of the oxidizing components oxygen ($O_2$), nitrogen oxides ($NO_x$) compared to the reducing exhaust gas components carbon monoxide (CO), hydrogen ($H_2$) and hydrocarbons (HC). Lean exhaust gas usually contains 3 to 15 vol.-% oxygen. However, during operation under load and full load, stoichiometric or even substoichiometric, i.e. rich, air/fuel mixtures are used even in lean burn engines.

Diesel engines on the other hand usually run under operating conditions with highly superstoichiometric air/fuel mixtures. Only in recent years have diesel engines been developed that can also be operated with rich air/fuel mixtures for short periods of time. In the present invention, diesel engines, in particular those with possible rich operating phases, are referred to as lean burn engines as well.

Due to the high oxygen content of the exhaust gases from lean burn engines, the nitrogen oxides contained therein cannot be continuously reduced to nitrogen in combination with a simultaneous oxidation of hydrocarbons and carbon monoxide by means of so-called three-way catalysts as is the case in stoichiometrically operated gasoline engines. Rather, with these catalysts a so-called temperature window for the reduction of the nitrogen oxides, which depends on the exhaust gas temperature, is observed. An increase in the exhaust gas temperature results in an initial increase in the nitrogen oxides conversion. At a certain temperature the conversion rate reaches a maximum and at higher temperatures the conversion rate recedes back to zero. Within the temperature window, the remaining hydrocarbons that are always still present in lean exhaust gas function as reducing agents for the nitrogen oxides.

The position and width of the temperature window as well as the maximum nitrogen oxide conversion within the temperature window depend on the formulation of the catalyst and the residual hydrocarbon content of the exhaust gas. Conventional three-way catalysts only show a low nitrogen oxides conversion within the temperature window. However, so-called HC—DeNOx catalysts were developed, which exhibit a maximum nitrogen oxides conversion in the temperature window of up to 60% at a temperature in the range of 180 to 250° C. The width of the temperature window is only about 50° C.

Despite the relatively high nitrogen oxide conversion rate within the temperature window, these catalysts only provide an average nitrogen oxide conversion of less than 30% throughout the standardized driving cycle MVEG-A.

In order to improve this situation, so-called nitrogen oxides storage catalysts were developed which store the nitrogen oxides contained in lean exhaust gas in the form of nitrates.

The mechanism of nitrogen oxides storage catalysts is described in detail in the SAE document, SAE 950809. Accordingly, nitrogen oxides storage catalysts consist of a catalyst material that commonly is applied on an inert, ceramic or metal honeycomb carrier, a so-called carrier, in the form of a coating. The catalyst material comprises the nitrogen oxides storage material and a catalytically active component. The nitrogen oxides storage material in turn consists of the actual nitrogen oxides storage component, deposited in highly dispersed form on a support material.

Basic alkali metal oxides, alkaline earth metal oxides and rare earth metal oxides, and in particular barium oxide, which react with nitrogen dioxide to form the corresponding nitrates, are predominantly used as storage components. It is known that in air these materials are mostly present in the form of carbonates and hydroxides. These compounds are also suitable for storing the nitrogen oxides. Thus, whenever basic storage oxides are mentioned in the present invention, this also includes the corresponding carbonates and hydroxides.

Noble metals of the platinum group are typically used as catalytically active components, which as a rule are deposited on the support material together with the storage component. Active aluminum oxide with a large surface area is usually used as support material. However, the catalytically active components can also be applied on a separate support material such as for example active aluminum oxide.

It is the task of the catalytically active components to convert carbon monoxide and hydrocarbons to carbon dioxide and water in the lean exhaust gas. Furthermore, they should oxidize the nitrogen monoxide portion of the exhaust gas to nitrogen dioxide so that it can then react with the basic storage material to form nitrates (storage phase). An increasing incorporation of the nitrogen oxides in the storage material causes a decrease in the material's storage capacity, which has to be regenerated from time to time. For this purpose, the engine is operated for a short period of time with stoichiometric or rich air/fuel mixtures (referred to as regeneration phase). In the reducing conditions of the rich exhaust gas, the formed nitrates decompose to nitrogen oxides $NO_x$ and, with the use of carbon monoxide, hydrogen and hydrocarbons as reducing agents, are reduced to nitrogen while water and carbon dioxide are formed.

During the operation of the nitrogen oxides storage catalyst, the storage phase and the regeneration phase regularly alternate. Usually, the storage phase lasts between 60 and 120 seconds, while the regeneration phase is completed in less than 20 seconds.

Nitrogen oxide storage catalysts allow considerably higher nitrogen oxides conversion rates in a larger temperature window than HC—DeNOx catalysts. Their nitrogen oxides conversions meet the exhaust limits according to the Euro IV standard, the introduction of which is planned for 2005.

However, in order to improve the safety of operation and long-term stability of these catalysts, it is necessary to increase their thermal stability, widen their temperature window and further improve the nitrogen oxides conversions attainable in that window.

Based on the forgoing, there is a need in the art for a catalyst for the prevention of nitrogen oxides in the exhaust gas from combustion engines, which has an improved thermal stability, a wider temperature window and a higher nitrogen oxides conversion rate in this window than conventional nitrogen oxides storage catalysts.

SUMMARY OF THE INVENTION

In the present invention a catalyst for lowering the amount of nitrogen oxides in the exhaust gas from lean burn engines, comprising at least one noble metal of the platinum group of the periodic table of the elements, and at least one nitrogen oxides storage material in combination with a homogeneous Mg/Al mixed oxide of magnesium oxide and aluminum oxide, wherein magnesium oxide is present in a concentration of about 1 to about 40 wt.-%, based on the total weight of the Mg/Al mixed oxide. Preferably, the concentration of magnesium oxide in the mixed oxide is between about 5 and less than about 28, in particular between about 10 and about 25 wt.-%.

For a better understanding of the present invention together with other and further advantages and embodiments, reference is made to the following description taken in conjunction with the examples, the scope of which is set forth in the appended claims.

BRIEF DESCRIPTION OF THE DRAWING

Preferred embodiments of the invention have been chosen for purposes of illustration and description, but are not intended in any way to restrict the scope of the invention. The preferred embodiments of certain aspects of the invention are shown in the accompanying figures, wherein.

DETAILED DESCRIPTION OF THE INVENTION

Figure 1:
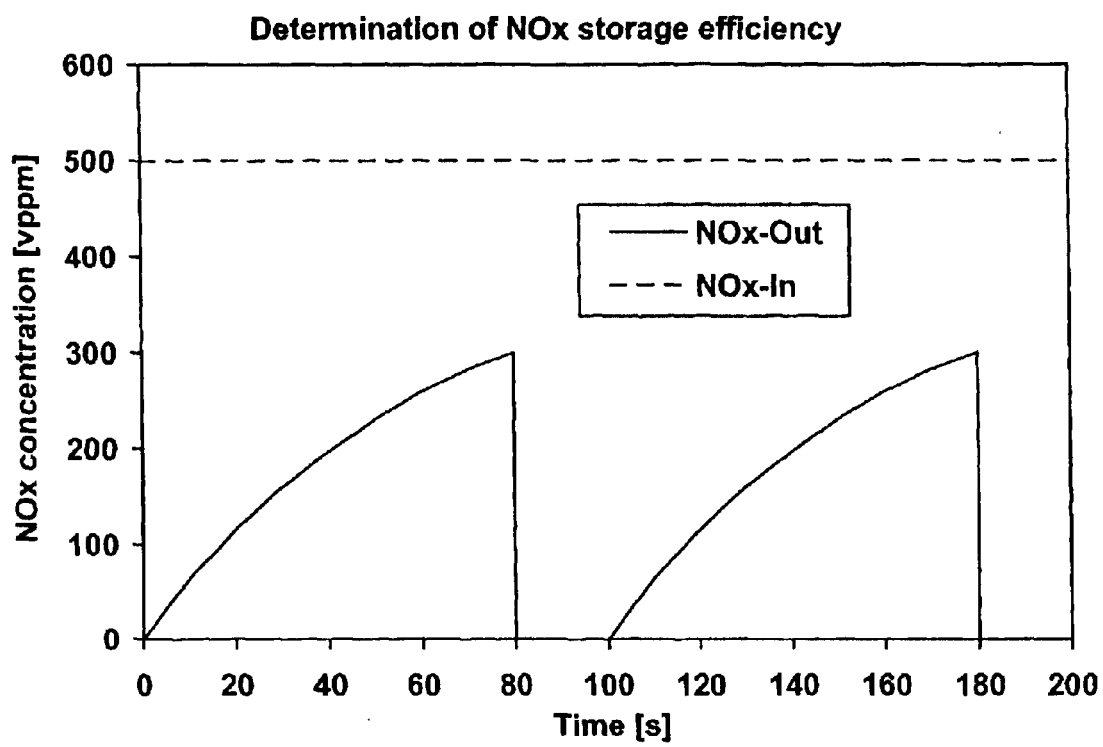
FIG. 1 illustrates the determination of the $NO_x$ storage efficiency.

The invention will now be described in connection with preferred embodiments. These embodiments are presented to aid in an understanding of the present invention and are not intended to, and should not be construed to, limit the invention in any way. All alternatives, modifications and equivalents, which may become obvious to those of ordinary skill on reading the disclosure are included within the spirit and scope of the present invention.

This disclosure is not a primer on catalysts for lowering the amount of nitrogen oxides in the exhaust gas from lean burn engines, basic concepts known to those skilled in the art have not been set forth in detail.

As used in the present invention, the term "mixed oxide" refers to an oxidic, solid powder material comprising of at least two components that form a mixture on an atomic level. This term excludes physical mixtures of oxidic powder materials. A homogeneous mixed oxide of magnesium oxide and aluminum oxide is an essential component of the catalyst according to the present invention. In the present invention, it is referred to as Mg/Al mixed oxide. Its composition over the cross-section of a powder grain is constant, i.e. homogeneous, within the accuracy of the measurement method.

In the following, a distinction is made between a nitrogen oxides storage material and the nitrogen oxides storage components. Nitrogen oxides storage components are for example the oxides, carbonates or hydroxides of alkali and alkaline earth metals that due to their basic properties are capable of forming nitrates with the acidic nitrogen oxides of the exhaust gas and of storing them in this manner. A nitrogen oxides storage material includes the storage components, deposited on suitable support materials in as highly dispersed a manner as possible in order to create a large area of interaction with the exhaust gas.

Storage materials comprising barium oxide and/or strontium oxide on a large-surface area support material such as for example aluminum oxide are often used for nitrogen oxide storage catalysts.

Research carried out by the inventors with respect to the storage of nitrogen oxides with the help of magnesium oxide deposited on aluminum oxide showed an unsatisfactory storage capacity. However, it was surprisingly found that a combination of this material with other storage materials, in particularly those on the basis of barium oxide or strontium oxide, may, under certain conditions, lead to a significant improvement of the $NO_x$ storage efficiency.

It turned out that it is essential that the magnesium oxide and the aluminum oxide form a homogeneous mixed oxide. In such a mixed oxide of magnesium oxide and aluminum oxide, the magnesium ions occupy the lattice positions of aluminum ions so that the X-ray structure of this material cannot be distinguished from the X-ray structure of pure aluminum oxide. Preferably, the material has a specific surface area of more than 40, in particular about 100 to about 200 m²/g. Preferably, materials with a specific surface area of about 130 to about 170 m²/g and most preferably with a surface area of about 100 to about 150 m²/g are used. The magnesium oxide imparts an improved thermal stability to the Mg/Al mixed oxide compared to γ-aluminum oxide. Yet this thermal stability is only optimal if the magnesium oxide is distributed as homogeneously as possible in the aluminum oxide throughout the entire grain of the mixed oxide. A merely superficial incorporation of the magnesium oxide into the grain of the aluminum oxide does not lead to the desired thermal stability.

Preferably, such a material can be prepared by means of a so-called sol-gel process that is known in the art. Another process is known in the art that involves mixtures of alkoxides and subsequent hydrolysis with water.

The subsequent impregnation of aluminum oxide with soluble precursor compounds of magnesium oxide and calcination for converting the precursor compound into magnesium oxide does not lead to homogeneous Mg/Al mixed oxides at common calcination temperatures. An attempt to force the formation of homogeneous Mg/Al mixed oxides by increasing the calcination temperatures results in low-surface area mixed oxides that are unsuitable for catalytic applications.

Further improvement of the thermal stability of the Mg/Al mixed oxide can be achieved by superficial impregnation of the mixed oxide with one or more rare earth oxides, in particular by coating the Mg/Al mixed oxide with praseodymium oxide and/or cerium oxide.

The use of the Mg/Al mixed oxide in the catalyst of the invention in combination with the nitrogen oxide storage material of the catalyst leads to a synergistic improvement of the nitrogen oxide storage capacity of the catalyst, which cannot be explained with the additive effect of magnesium oxide and storage material. In addition, the Mg/Al mixed oxide in the catalyst also serves as support material for the catalytically active noble metals of the platinum group. Preferably, platinum, palladium, rhodium or mixtures thereof are used. The entire amount of noble metals intended for the catalyst may be deposited on the Mg/Al mixed oxide. Preferably, however, only a partial amount of the noble metals is applied onto the Mg/Al mixed oxide.

In a specific embodiment of the catalyst, the noble metals platinum and/or palladium are applied onto the homogeneous Mg/Al mixed oxide. Another partial amount of platinum can be deposited directly on the nitrogen oxide storage material. Thus, the oxidation of nitrogen monoxide to form nitrogen dioxide takes place in the immediate vicinity of the storage components, which has a positive effect on the activity (storage and regeneration) of the catalyst at high exhaust gas temperatures.

In order to achieve as complete a conversion of the desorbed nitrogen oxides as possible during the regeneration phase, it is advantageous to add a further support material with rhodium deposited thereon to the catalyst. Active and optionally stabilized aluminum oxide is a suitable support material for rhodium.

Suitable additional support materials include cerium oxide or cerium/zirconium mixed oxides. Instead of rhodium, platinum is preferably deposited on this additional support material.

In another embodiment of the catalyst, the noble metals platinum and/or rhodium can be applied onto the homogeneous Mg/Al mixed oxide. In this case as well, an additional partial amount of platinum can be deposited directly on the nitrogen oxide storage material. In order to achieve as complete a conversion of the desorbed nitrogen oxides as possible during the regeneration phase, a further support material with rhodium deposited thereon can be added to the catalyst in this embodiment as well. Preferably, active and optionally stabilized aluminum oxide is used as additional support material. Alternatively, cerium oxide or cerium/zirconium mixed oxides with platinum instead of rhodium deposited thereon are also suitable additional support materials.

As nitrogen oxide storage components of the catalyst according to the present invention, use can be made of oxides, carbonates or hydroxides of magnesium, calcium, strontium, barium, alkali metals, rare earth metals or mixtures thereof. High-melting point metal oxides, whose melting point lies above the temperatures occurring in the process, are suitable support materials for these components. These metal oxides are preferably selected from the group consisting of cerium oxide, cerium mixed oxides, aluminum oxide, magnesium oxide, a homogeneous Mg/Al mixed oxide, calcium titanate, strontium titanate, barium titanate, barium zirconate, lanthanum oxide, praseodymium oxide, samarium oxide, neodymium oxide, yttrium oxide and lanthanum manganate or mixtures thereof.

The use of strontium or barium as nitrogen oxide storage components fixed on a support material of cerium oxide or cerium mixed oxides is especially advantageous. A cerium mixed oxide, in particular a cerium/zirconium mixed oxide with a zirconium content of about 1 to about 25 wt.-%, based on the total weight of the mixed oxide, is especially suitable as support material. The mixed oxide may additionally be doped with about 0.5 to about 80 wt.-% of at least one oxide of an element selected from the group consisting of zirconium, silicon, scandium, yttrium, lanthanum and the rare earth metals or mixtures thereof, based on the total weight of the storage material. Preferably, the cerium/zirconium mixed oxide is doped with about 0.5 to about 10 wt.-% lanthanum and/or praseodymium oxide, based on the total weight of the cerium/zirconium mixed oxide and lanthanum and/or praseodymium oxide.

The catalyst according to the present invention is especially suitable for the purification of exhaust gases from lean burn engines, i.e. lean gasoline engines and diesel engines.

Having now generally described the invention, the same may be more readily understood through the following references to the following examples, which are provided by way of illustration and are not intended to limit the present invention unless specified.

EXAMPLES

The invention is described in more detail in the following examples and figures.

As has already been explained above, it has been found that the combination of the Mg/Al mixed oxide and storage materials, in particular those based on barium oxide and strontium oxide, leads to a synergistic effect with respect to the width of the temperature window for the nitrogen oxides storage and to the maximum conversion rate. This effect cannot be observed when the Mg/Al mixed oxide is used by itself. Therefore, in the following examples and comparative examples complete catalysts were prepared using this material and their storage efficiency for nitrogen oxides was determined as a function of the exhaust gas temperature. The storage efficiency of a catalyst is the most important parameter for evaluating its performance. It describes the effectiveness regarding the removal of nitrogen oxides from the exhaust gas from lean burn engines.

The $NO_x$ storage efficiency of the catalysts was determined in a model gas unit. For this purpose, the storage catalysts were subjected to a so-called rich/lean cycle, i.e. lean and rich exhaust gases were alternately passed through the catalysts at defined temperatures. Lean exhaust gas compositions were achieved by supplying oxygen while at the same time the supply of carbon monoxide and hydrogen was discontinued. Rich exhaust gas compositions were prepared by the opposite course of action.

In the lean phases, the nitrogen oxides were stored by each of the catalysts. During the rich phases, the nitrogen oxides were desorbed again and converted to nitrogen, carbon dioxide and water at the catalyst by means of the reducing components carbon monoxide, hydrogen and hydrocarbons.

FIG. 1 shows these conditions in an idealized manner. During the measurements, the exhaust gas has a constant concentration of 500 vppm (volume ppm) nitrogen monoxide (NO). The nitrogen oxide concentration entering the storage catalyst ($NO_x$ In) is therefore represented by the straight broken line in FIG. 1. The nitrogen oxide concentration after the storage catalyst ($NO_x$ Out) is zero at first since the fresh storage catalyst ideally binds all the nitrogen oxides contained in the exhaust gas. As time passes, the storage catalyst is loaded with nitrogen oxides and its storage capacity decreases. Thus, increasingly fewer nitrogen oxides are bound to the storage catalyst so that after the catalyst an increasing nitrogen oxide concentration can be measured, which, after the storage catalyst has been completely saturated with nitrogen oxides, would approach the initial concentration. For this reason, regeneration of the catalyst has to be initiated after a certain amount of time (in FIG. 1 after 80 seconds). This is done by enriching the exhaust gas for about 20 seconds. This causes the nitrogen oxides to be desorbed and, ideally, to be completely converted at the storage catalyst so that during the regeneration period, no nitrogen oxides can be measured after the storage catalyst. Afterwards, it is again switched to lean exhaust gas and the storage of nitrogen oxides resumes.

The storage efficiency of the storage catalyst at one point of time is defined as the following ratio:

$$\frac{NO_x \text{In} - NO_x \text{Out}}{NO_x \text{In}}$$

As can be inferred from FIG. 1, this efficiency is time-dependent. Therefore, in order to evaluate the storage catalysts, the storage efficiency S was determined by integrating each storage phase and forming an average value of eight consecutive storage cycles:

$$S = \frac{1}{8}\sum_{1}^{8}\int_{t=0}^{80}\frac{NO_x \text{In} - NO_x \text{Out}}{NO_x \text{In}} dt \times 100 \, [\%].$$

Thus, the storage efficiency S is not a constant of the material, but depends on the parameters of the selected rich/lean cycle. The following conditions were selected for the evaluation of the prepared storage catalysts:

Parameters of the Rich/lean Cycle

| | |
|---|---|
| Space velocity: | 30,000 $h^{-1}$ |
| Temperature range: | 150–500° C. in 50° C. increments |
| Number of rich/lean cycles: | 8 per temperature increment |
| Duration of the lean phase: | 80 seconds |
| Duration of the rich phase: | 20 seconds |

TABLE 1

Exhaust gas composition

| | Concentration | | | |
|---|---|---|---|---|
| Gas component | during the lean phase | | during the rich phase | |
| NO | 500 | vppm | 500 | vppm |
| $CO_2$ | 10.0 | vol.-% | 10.0 | vol. % |
| $H_2O$ | 10.0 | vol.-% | 10.0 | vol. % |
| $C_3H_6$ | 50 | vppm | 50 | vppm |
| $O_2$ | 8.0 | vol. % | 0.2 | vol. % |
| CO | 0.0 | vol. % | 2.67 | vol. % |
| $H_2$ | 0.0 | vol. % | 1.33 | vol. % |

The catalyst formulations examined in the following examples consist of different components. These components were processed into an aqueous coating suspension with which cordierite honeycomb carriers having a cell density of 62 $cm^{-2}$ (number of flow ducts of the honeycomb carrier per cross-section area) were coated by means of an immersion process. The coated honeycomb carriers were dried and subsequently calcined in air at 500° C. for 2 hours.

The nitrogen oxides storage efficiency of the coated honeycomb carriers was determined as described above in a model gas unit both in a fresh state and after ageing. For ageing, the catalysts were stored in air at a temperature of 850° C. for 24 hours.

FIGS. 2 to 12 show the thus determined storage efficiency values of different storage catalysts as a function of the exhaust gas temperature. Table 3 shows the composition of the coating of the examined catalysts. The first and second columns of this table show the coating components used and their concentration in grams per liter of honeycomb carrier volume. Columns 3 to 5 indicate the concentrations of the platinum group metals present on the individual coating components. In some examples, the mixed oxide and the storage material were simultaneously impregnated with noble metals. In these cases, Table 3 only shows the total concentration of the noble metal (for example platinum) on both materials.

Preparation of Platinum-containing, Catalytic Mg/Al Mixed Oxide Powders

Homogeneous Mg/Al mixed oxide powders with different magnesium oxide/aluminum oxide ratios were prepared for the following examples and comparative examples. First, a mixture of a magnesium alkoxide and an aluminum alkoxide was prepared according to document DE 195 03 522 A1, and the mixture was hydrolyzed with water. The resulting hydroxide mixture was dried and calcined in air at 700° C. for 24 hours to complete the preparation of the homogeneous mixed oxide.

In this manner, four powders having the following magnesium oxide/aluminum oxide ratios were prepared:

TABLE 2

Composition and properties of the Mg/Al mixed oxide powders

| Name | MgO content [wt.-%] | $Al_2O_3$ content [wt.-%] | BET surface [$m^2$/g] |
|---|---|---|---|
| Mg/Al mixed oxide I | 28.2 | 71.8 | 160 |
| Mg/Al mixed oxide II | 20 | 80 | 142 |
| Mg/Al mixed oxide III | 10 | 90 | 162 |
| Mg/Al mixed oxide IV | 5 | 95 | 153 |

The composition of the Mg/Al mixed oxide I corresponds to a magnesium-aluminum spinel ($MgO \cdot Al_2O_3$). However, the invention is not restricted to magnesium oxide contents of the mixed oxide that are smaller than or equal to that of a stoichiometric magnesium-aluminum spinel. The synergistic effect of this mixed oxide on the catalytic activity of nitrogen oxide storage materials was still observed at magnesium oxide contents of 35 to 40 wt.-%.

The morphology of the homogeneous Mg/Al mixed oxide II was examined by means of a transmission electron microscope (TEM). The material was first coated with 2.5 wt.-% platinum, based on the total weight of Mg/Al mixed oxide and platinum. For this purpose, the Mg/Al mixed oxide was suspended in water and impregnated by the addition of a solution of hexahydroxoplatinic acid ($H_2Pt(OH)_6$) dissolved in ethanolamine. After the noble metal had been adsorbed on the mixed oxide, it was dried and calcined in air at 500° C.

Figure 13:
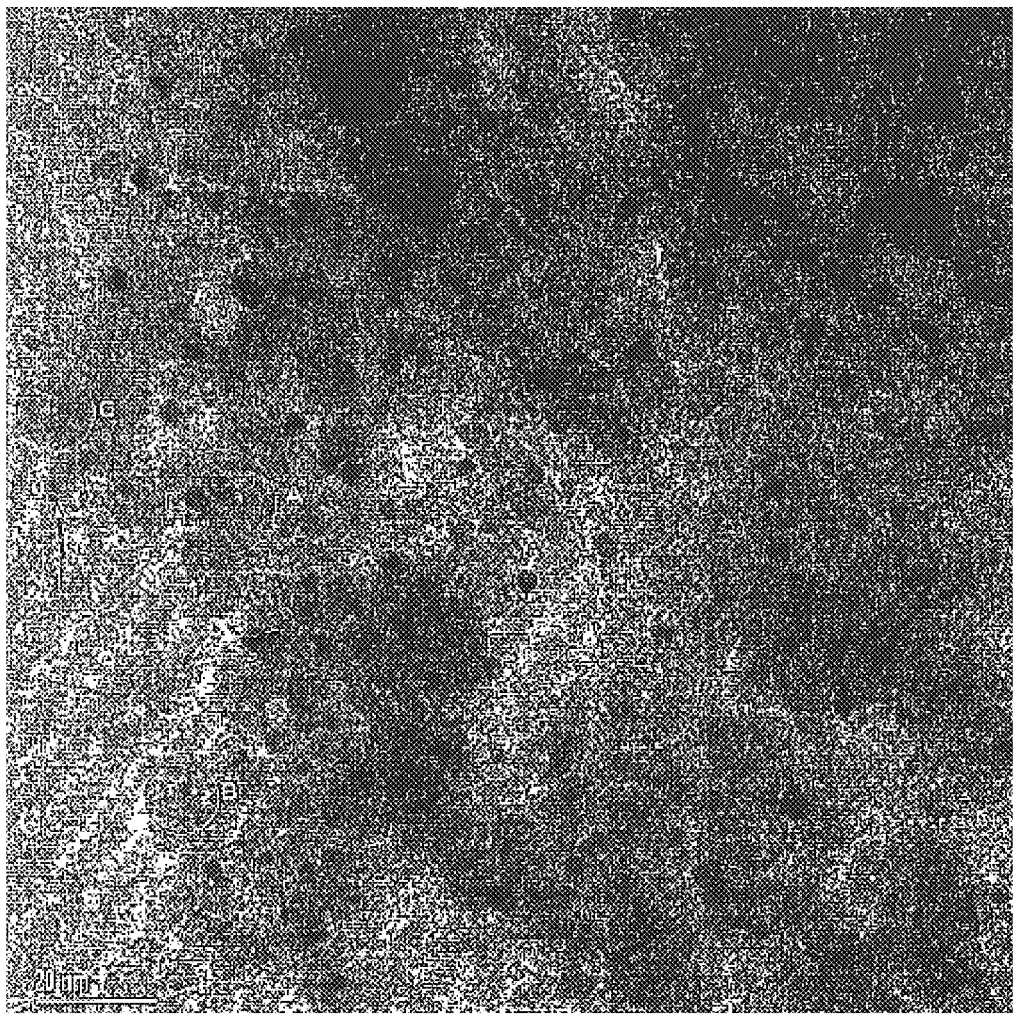
FIG. 13 is the TEM photograph of the Mg/Al mixed oxide II coated with platinum (see Table 2), wherein the magnesium oxide powder is homogeneously dissolved in the aluminum oxide (catalytic powder 1).

FIG. 13 shows an electron microscopic photograph of the prepared powder material. At the points designated A, B and C, the composition of the material was determined by means of energy-dispersive X-ray analysis. Within the accuracy of the measurement method, the material exhibits a constant MgO content of 20 wt.-% at all points.

Comparative Example 1
(Comparative Catalyst CC1)

A conventional storage catalyst was prepared, comprising a storage material, aluminum oxide coated with platinum and palladium and aluminum oxide coated with rhodium.

A cerium/zirconium mixed oxide (90 wt.-% cerium oxide and 10 wt.-% zirconium oxide) coated with barium oxide was used as storage material, prepared in accordance with the process described in DE 199 55 456 A1. The concentration of the storage component barium oxide was 17.8 wt.-% based on the total weight of the storage material. The material had a BET surface of 23 $m^2/g$. In the following, it will be referred to as BaO/Ce/Zr oxide.

For preparing the aluminum oxide coated with rhodium, aluminum oxide stabilized with 3 wt.-% lanthanum (BET surface 202 $m^2/g$) was impregnated with a rhodium nitrate solution, dried and calcined in air at 500° C. so that the finished material contained a total of 3.37 wt.-% rhodium, based on the total weight of the material.

For preparing the aluminum oxide coated with platinum and palladium, aluminum oxide stabilized with 10 wt.-% lanthanum (BET surface 170 $m^2/g$) was first impregnated with an aqueous solution of hexahydroxoplatinic acid ($H_2Pt(OH)_6$) in ethanolamine, dried and calcined in air at 500° C. The material contained 2.5 wt.-% platinum based on its total weight. This material was then suspended in water. A solution of palladium nitrate was added to this suspension, and after sorption of the palladium nitrate on the material the storage material and the rhodium-coated aluminum oxide were added to the suspension. The suspension was ground to a particle size of 3 to 5 $\mu$m ($d_{50}$) and applied onto a commercially available cordierite honeycomb carrier with 62 cells per square centimeter by means of an immersion process.

The coated honeycomb carrier was dried at 120° C. in a drying oven. Then, the coated honeycomb carrier was calcined for 4 hours at 500° C.

Table 3 indicates the concentrations of the individual coating materials in grams per liter of honeycomb carrier volume and the concentrations of the platinum group metals deposited thereon of this catalyst, which will hereinafter be referred to as Comparative Catalyst CC1.

Figure 2:
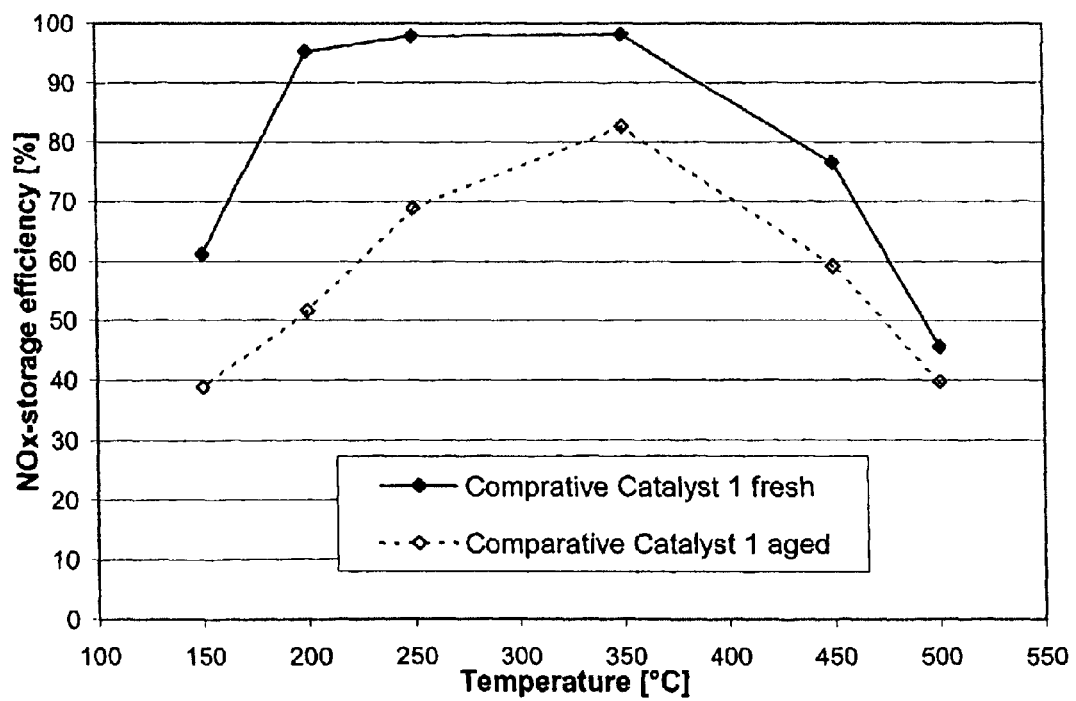
FIG. 2 illustrates the $NO_x$ storage efficiency for Comparative Catalyst 1.

FIG. 2 shows the nitrogen oxide storage efficiency of this comparative catalyst, both in a fresh and in an aged state. While the catalyst exhibits a very good nitrogen oxide storage capacity in a fresh state, the storage capacity clearly collapses after the catalyst has undergone ageing.

Comparative Example 2
(Comparative Catalyst CC2)

Another comparative catalyst (CC2) with a composition as given in Table 3 was prepared. Only platinum was used as catalytically active noble material, and in contrast to Comparative Example 1, the platinum was deposited on the homogeneous Mg/Al mixed oxide II instead of on a stabilized aluminum oxide. The Mg/Al mixed oxide II was also used instead of the storage material BaO/Ce/Zr oxide.

In order to deposit platinum on the Mg/Al mixed oxide, this powder was impregnated with an aqueous solution of hexahydroxoplatinic acid ($H_2Pt(OH)_6$) dissolved in ethanolamine, dried and calcined in air at 500° C. The thus prepared mixed oxide contained 2.5 wt.-% platinum based on its total weight.

Figure 3:
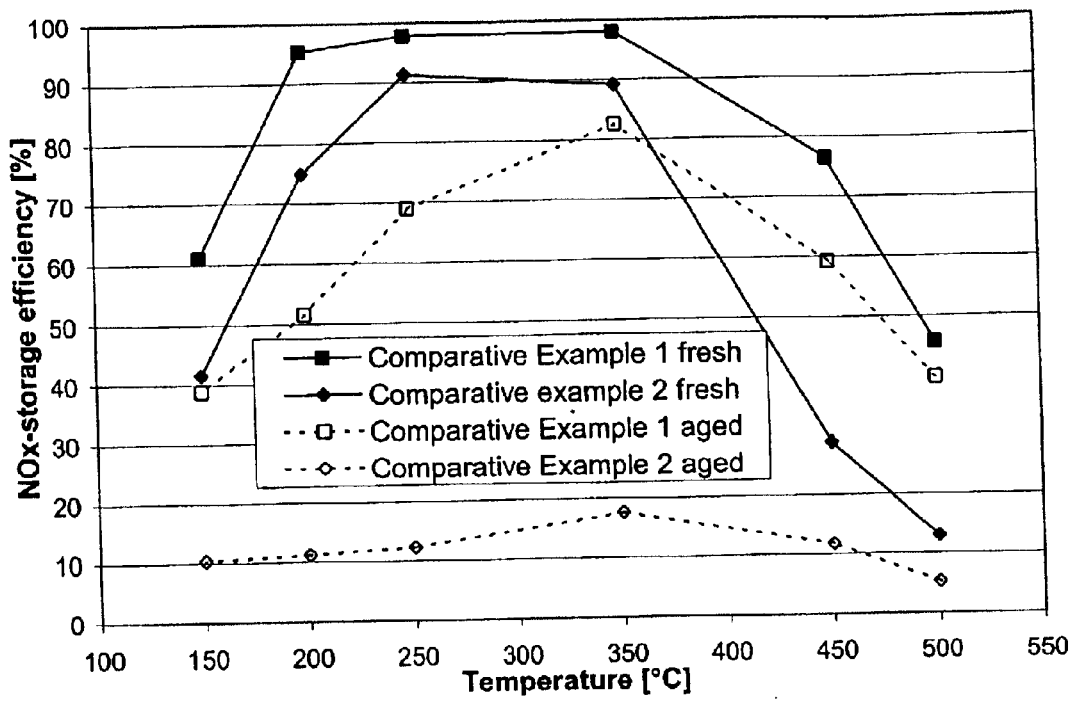
FIG. 3 illustrates the $NO_x$ storage efficiency for Comparative Catalysts 1 and 2.

FIG. 3 shows the comparison of the nitrogen oxide storage efficiencies of the two Comparative Catalysts CC1 and CC2, both in fresh and aged states. Even in a fresh state, Comparative Catalyst CC2 is clearly inferior to Catalyst CC1. After ageing, Comparative Catalyst CC2 has become completely unsuitable for the storage of nitrogen oxides.

Example 1
(Catalysts C1a and C1b)

Two storage catalysts were prepared according to the present invention, which will be referred to in the following as C1a and C1b.

Contrary to Comparative Example 2, the Mg/Al mixed oxide not coated with platinum of Comparative Example 2 was replaced with the storage material BaO/Ce/Zr oxide for the preparation of Catalyst C1a. The composition of the catalyst can be inferred from Table 3.

For the preparation of Catalyst C1b, an aqueous suspension of the storage material BaO/Ce/Zr oxide and the Mg/Al mixed oxide II was prepared. A solution of hexahydroxoplatinic acid ($H_2Pt(OH)_6$) dissolved in ethanolamine was added to this suspension. After adsorption of the noble metal on the two oxidic components of the suspension, a honeycomb carrier was coated with the suspension. The coating composition can be inferred from Table 3. In contrast to Catalyst C1a, the noble metal platinum is present both on the Mg/Al mixed oxide and the storage material of Catalyst C1b.

Figure 4:
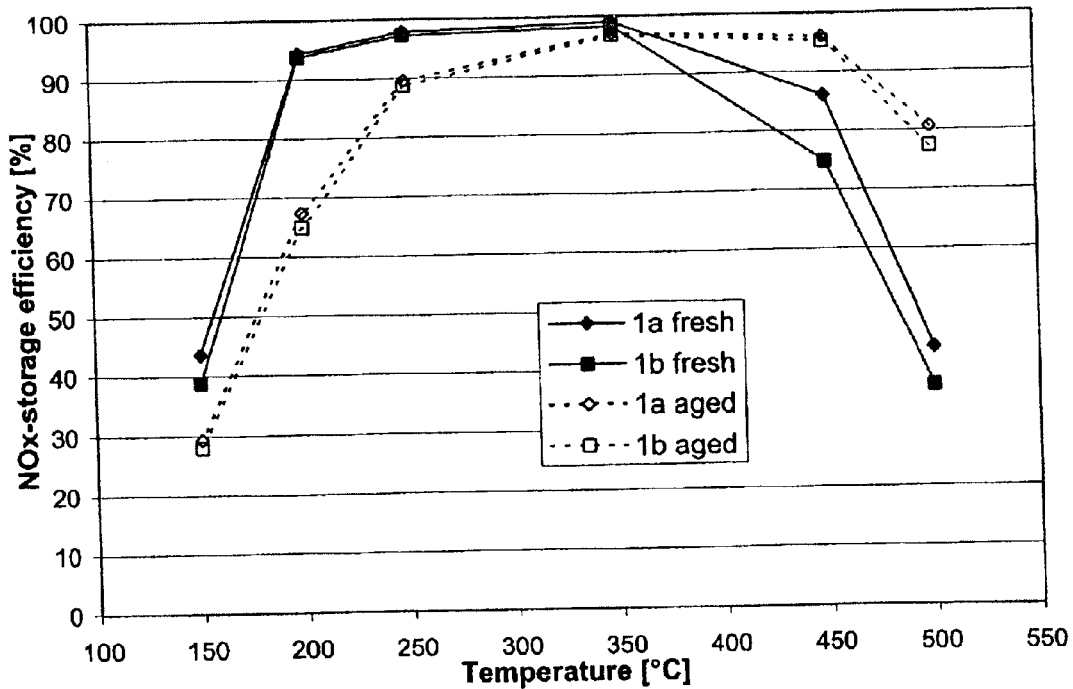
FIG. 4 illustrates the $NO_x$ storage efficiency for the catalysts of Example 1.

FIG. 4 shows the comparison of the activity in a fresh state and the activity after ageing of the two catalysts. After ageing, the catalysts according to the present invention exhibit a markedly higher storage capacity throughout the entire temperature window than Comparative Catalyst CC1. It is also noticeable that the storage capacity considerably increases at higher temperatures compared to the fresh state.

Example 2
(Catalysts C2a and C2b)

For the preparation of Catalyst 2a, the Mg/Al mixed oxide II was first coated with platinum as described in Comparative Example 2 and then suspended in water. Palladium nitrate was stirred into the suspension. After sorption of the palladium nitrate on the Mg/Al mixed oxide catalyzed with platinum, the storage material BaO/Ce/Zr oxide was added to the suspension and a honeycomb carrier was coated with the resulting suspension.

For the preparation of Catalyst 2b, the Mg/Al mixed oxide II was first coated with platinum as described in Comparative Example 2 and then suspended in water together with the storage material. Then palladium nitrate was stirred into the suspension. After sorption of the palladium nitrate on the two oxidic components, a honeycomb carrier was coated with the resulting suspension.

Figure 5:
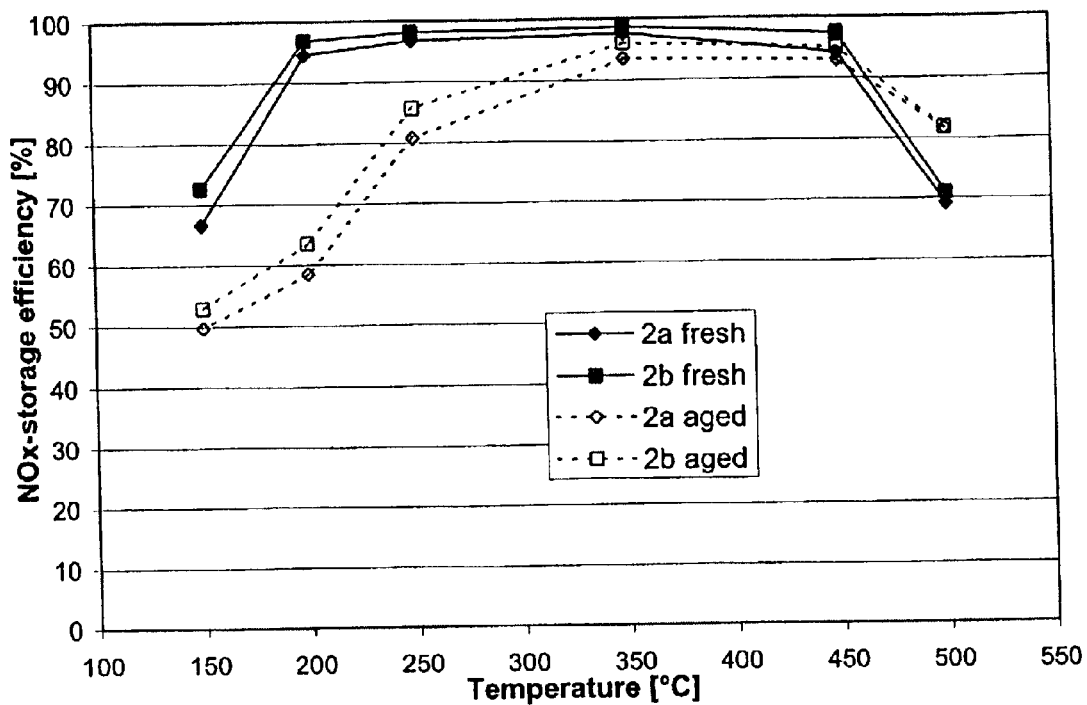
FIG. 5 illustrates the $NO_x$ storage efficiency for the catalysts of Example 2.

The nitrogen oxide storage efficiencies of both catalysts in fresh and aged states are shown in FIG. 5. Both catalysts in their fresh states exhibit a considerably wider temperature window than all the other previously examined catalysts.

Example 3
(Catalysts C3a and C3b)

Example 2 was repeated, but palladium was replaced with rhodium so that the catalyst compositions listed in Table 3 were obtained. Rhodium nitrate was used as a precursor compound of rhodium.

Figure 6:
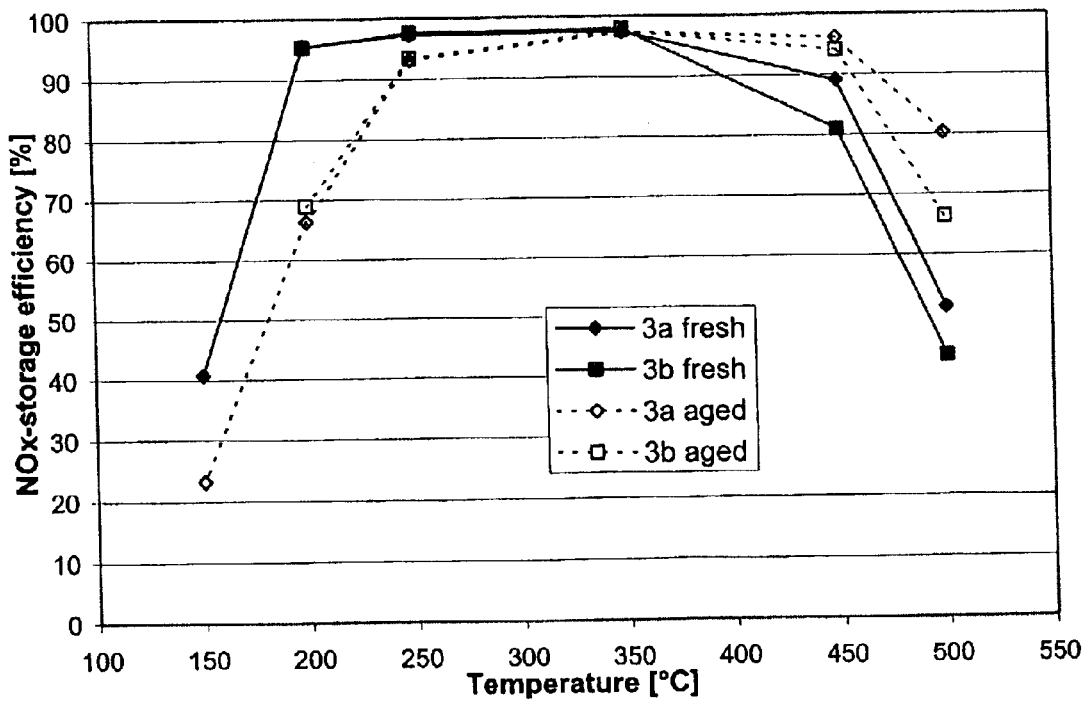
FIG. 6 illustrates the $NO_x$ storage efficiency for the catalysts of Example 3.

The nitrogen oxide storage capacities resulting from the replacement of palladium with rhodium are summarized in FIG. 6. While the fresh catalysts only show differences in the storage capacity compared to Example 2 in the high temperature range, the aged catalysts exhibit superior storage efficiency at 200° C. and 250° C.

Example 4
(Catalysts C4a and C4b)

The coating of Catalyst 4a, just like that of Catalyst 1a, comprises the Mg/Al mixed oxide II catalyzed with platinum in addition to the storage material BaO/Ce/Zr oxide. Additionally, the coating comprises $La/Al_2O_3$ catalyzed with rhodium, as does Comparative Catalyst CC1.

In contrast to Catalyst 4a, in Catalyst 4b the Mg/Al mixed oxide II was coated also with palladium in addition to platinum.

Figure 7:
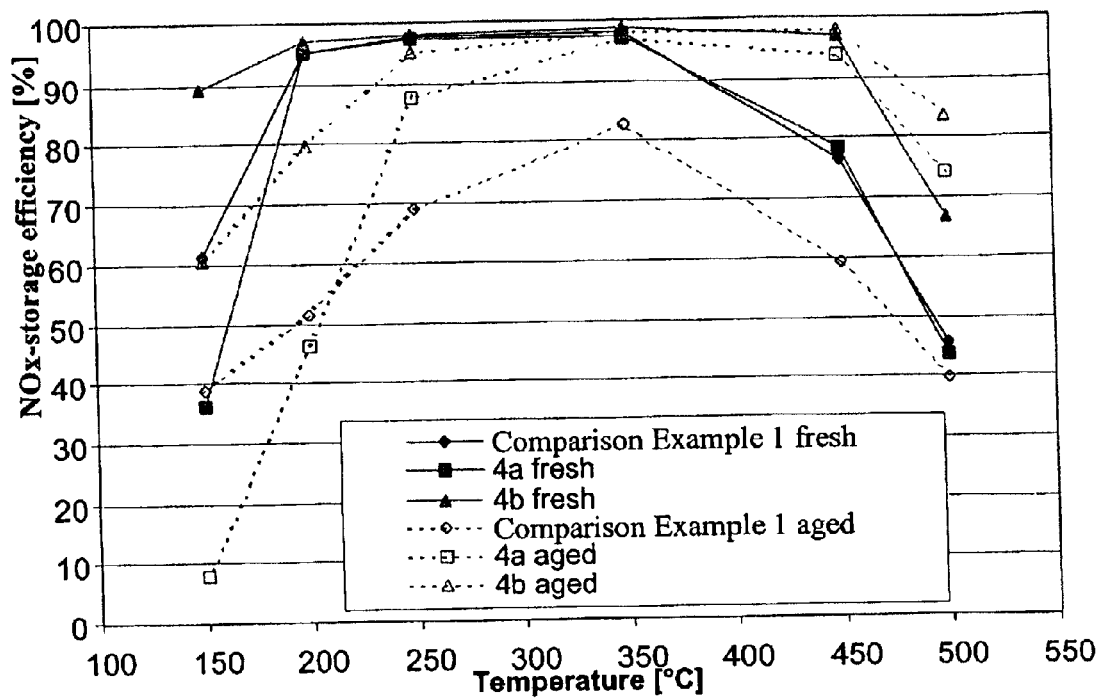
FIG. 7 illustrates the $NO_x$ storage efficiency for the catalysts of Example 4 in comparison with Comparative Catalyst 1.

FIG. 7 shows that the storage efficiencies of inventive Catalysts 4a and 4b in an aged state exhibit essential advantages over Comparative Catalyst CC1. Catalyst 4b has the best storage efficiency both fresh and aged.

Example 5
(Catalysts C5a, C5b and C5c)

In order to examine the influence of the mixing ratio of magnesium oxide to aluminum oxide in the homogeneous Mg/Al mixed oxide on the storage efficiency, the Mg/Al mixed oxide II in the catalyst composition according to Catalyst 4b was replaced with the mixed oxides I, III and IV.

The composition of the resulting Catalysts 5a, 5b and 5c is shown in Table 3.

Figure 8:
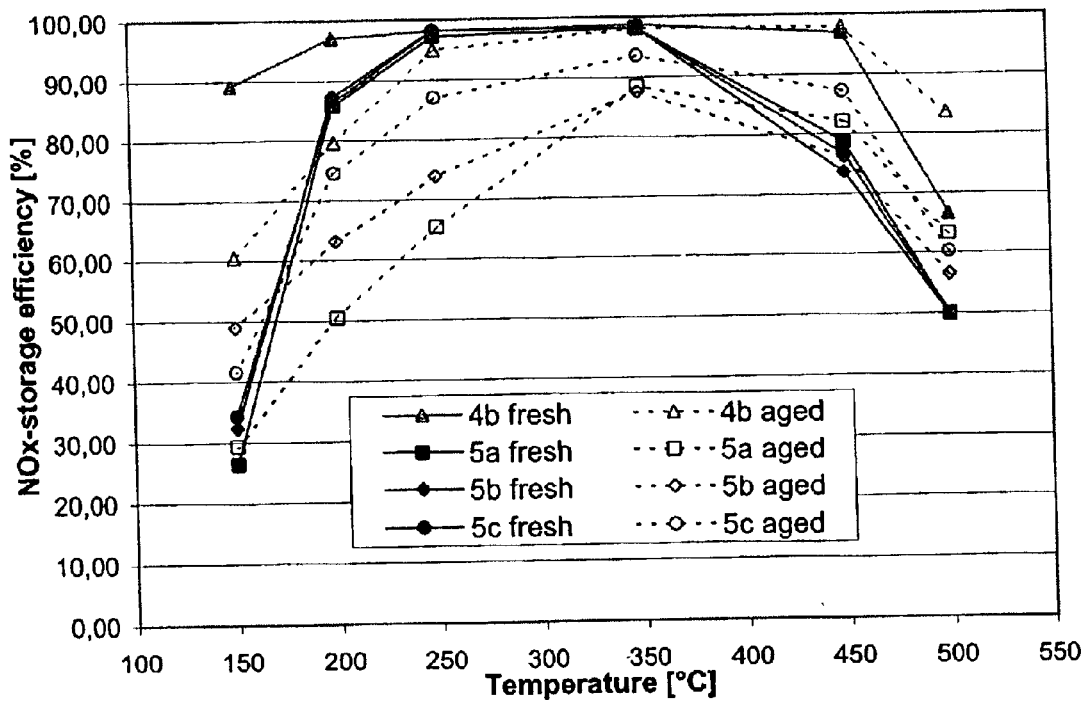
FIG. 8 illustrates the $NO_x$ storage efficiency for Catalyst 4b and the catalysts of Example 5.

In FIG. 8, the fresh and the aged storage efficiencies of these catalysts are compared with those of Catalyst 4b. It can be inferred that Catalyst 4b has the best storage efficiency both fresh and aged, i.e., the best results are achieved with the Mg/Al mixed oxide II with an $MgO/Al_2O_3$ ratio of 20/80.

Comparative Example 3
(Comparative Catalyst CC3)

Comparative Catalyst CC3 was prepared analogously to Catalyst 4b, however, the homogeneous Mg/Al mixed oxide II was replaced with an aluminum oxide doped with magnesium oxide. This material was obtained by impregnating $\gamma$-$Al_2O_3$ with magnesium acetate, drying and calcining for 2 hours at 900° C. In Table 3, this material is referred to as Mg/Al oxide II in order to distinguish it from the homogeneous Mg/Al mixed oxide II. Just like the Mg/Al mixed oxide II, its $MgO/Al_2O_3$ ratio was 20/80.

Figure 14:
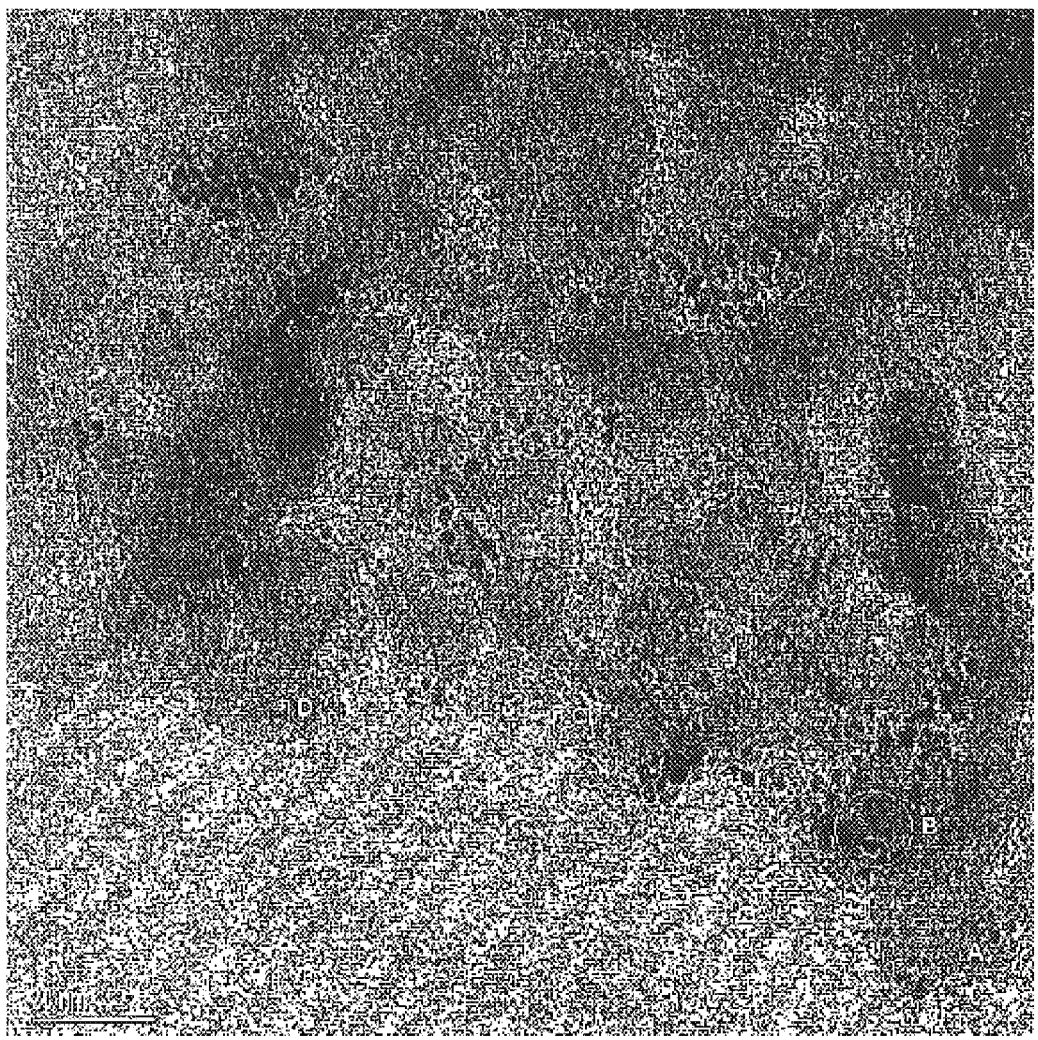
FIG. 14 is the TEM photograph of the Mg/Al oxide II of magnesium oxide and aluminum oxide from Comparative Example 3. In this case, magnesium oxide was applied onto the aluminum oxide by impregnation.

After impregnation with 2.5 wt.-% platinum, the Mg/Al oxide II was also examined under an electron microscope. FIG. 14 shows the corresponding photograph of the material. At points A to D, the composition of the material was determined by means of energy-dispersive X-ray analysis.

In contrast to the homogeneous Mg/Al mixed oxide II, the impregnated Mg/Al oxide II showed considerable fluctuations in the magnesium oxide concentration depending on the point of examination. The following concentrations were measured at points A to D:

A=55 wt.-%
B=50 wt.-%
C=84 wt.-%
D=5 wt.-%

Comparative Example 4
(Comparative Catalyst CC4)

Comparative Catalyst CC4 was prepared analogously to Catalyst 5a, however, the homogeneous Mg/Al mixed oxide III was replaced with an aluminum oxide doped with magnesium oxide. This material was obtained by impregnating $\gamma$-$Al_2O_3$ with magnesium acetate, drying and calcining for 2 hours at 900° C. In Table 3, this material is referred to as Mg/Al oxide III in order to distinguish it from the homogeneous Mg/Al mixed oxide III. Just like the Mg/Al mixed oxide III, its $MgO/Al_2O_3$ ratio was 10/90.

Figure 9:
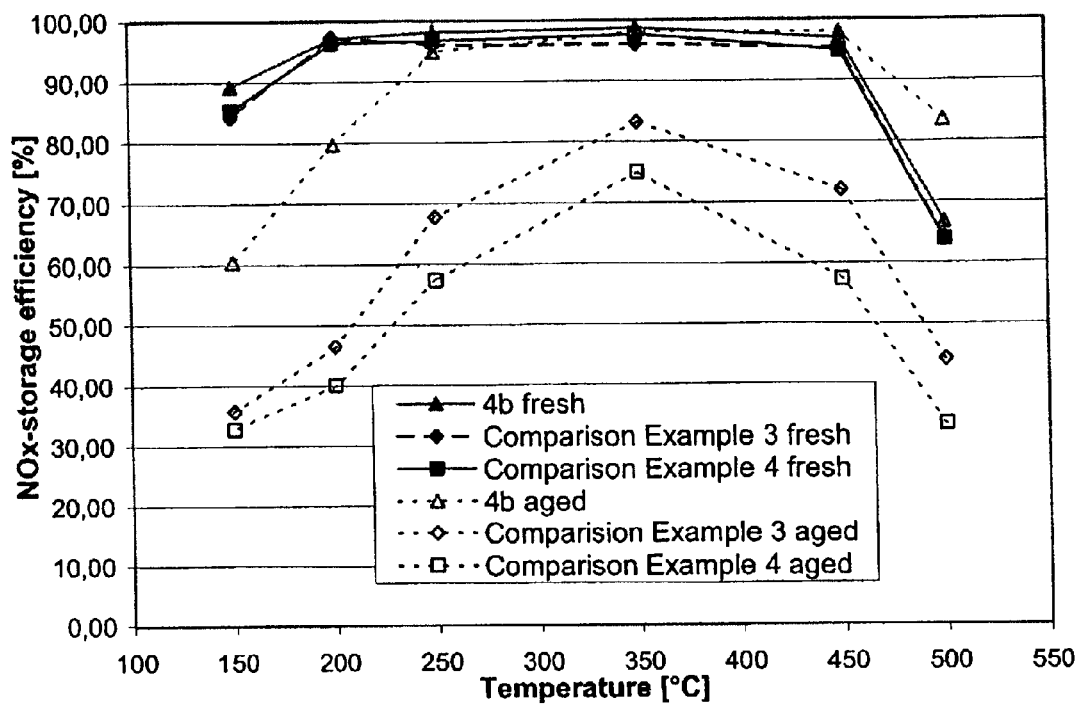
FIG. 9 illustrates the $NO_x$ storage efficiency for Catalyst 4b and Comparative Examples 3 and 4.

FIG. 9 shows a comparison of the storage efficiencies of the two Comparative Catalysts CC3 and CC4 and the storage efficiency of Catalyst 4b. The two comparative catalysts hardly differ from Catalyst 4b in their fresh state. After ageing, the two comparative catalysts are clearly inferior. These results show that a superficial impregnation of aluminum oxide with magnesium oxide does not lead to the desired synergistic effect. No expansion of the temperature window takes place, in particular after thermal ageing. Only a homogeneous distribution of the magnesium oxide in the aluminum oxide leads to the desired high thermal stability of the catalyst.

Comparative Example 5
(Comparative Catalyst CC5)

Comparative Catalyst CC5 was prepared analogously to Catalyst 4a, however, the homogeneous Mg/Al mixed oxide II was replaced with hydrotalcite that had been calcined for 2 hours at 900° C. The $MgO/Al_2O_3$ ratio of the hydrotalcite was 50:50.

Comparative Example 6
(Comparative Catalyst CC6)

Comparative Catalyst CC6 was prepared analogously to Catalyst 4b, however, the homogeneous Mg/Al mixed oxide II was replaced with a physical mixture of a lanthanum-stabilized $\gamma$-aluminum oxide and magnesium oxide in a mixing ratio of 80/20. The mixture of the two powder materials was impregnated with 2.5 wt.-% platinum by means of the known process of pore volume impregnation. The aqueous solution of hexahydroxoplatinic acid ($H_2Pt(OH)_6$) in ethanolamine, which had already been used in the other examples, was used as the precursor compound of platinum. The impregnated material was dried and calcined in air for 2 hours at 500° C.

Figure 10:
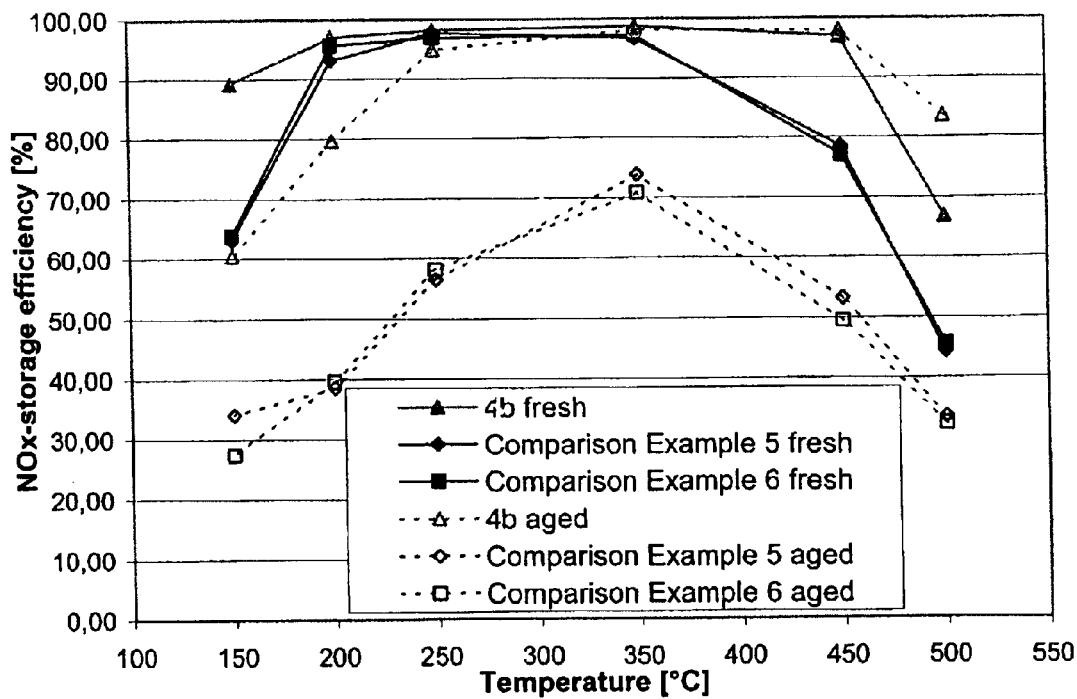
FIG. 10 illustrates the $NO_x$ storage efficiency for Catalyst 4b and Comparative Examples 5 and 6.

FIG. 10 shows a comparison of the storage efficiencies of the two Comparative Catalysts CC5 and CC6 and the storage efficiency of Catalyst 4b. Already in their fresh state, the two comparative catalysts show a narrower temperature window than Catalyst 4b. After ageing, the two comparative catalysts are even more inferior.

The results of Comparative Examples 3 to 6 show that neither hydrotalcite nor the physical mixture of aluminum oxide and magnesium oxide nor an impregnation of aluminum oxide with magnesium oxide comes close to the positive influence a homogeneous Mg/Al mixed oxide has on the storage efficiency.

Example 6
(Catalysts C6a and C6b)

Catalysts 6a and 6b were also prepared analogously to Catalyst 4b.

In contrast to Catalyst 4, for Catalyst 6a the Mg/Al mixed oxide II catalyzed with platinum was modified prior to the preparation of the coating suspension by impregnating with an aqueous solution of praseodymium acetate, drying and calcining with 10 g praseodymium oxide.

For Catalyst 6b, the Mg/Al mixed oxide II was modified in a first step with only 5 g praseodymium oxide and in a second step by impregnation with cerium nitrate with 5 g cerium oxide. After each impregnation step, the material was dried and calcined. The compositions of Catalysts 6a and 6b are given in Table 3.

Example 7
(Catalysts C7a and C7b)

Catalyst 7a was prepared analogously to Catalyst 6a. Instead of with praseodymium oxide, the Mg/Al mixed oxide II catalyzed with platinum was modified with 10 g cerium oxide by impregnation with cerium nitrate, drying and calcining.

Contrary to Catalyst 7a, for the preparation of catalyst 7b the Mg/Al mixed oxide II was only modified with 5 g cerium oxide.

Figure 11:
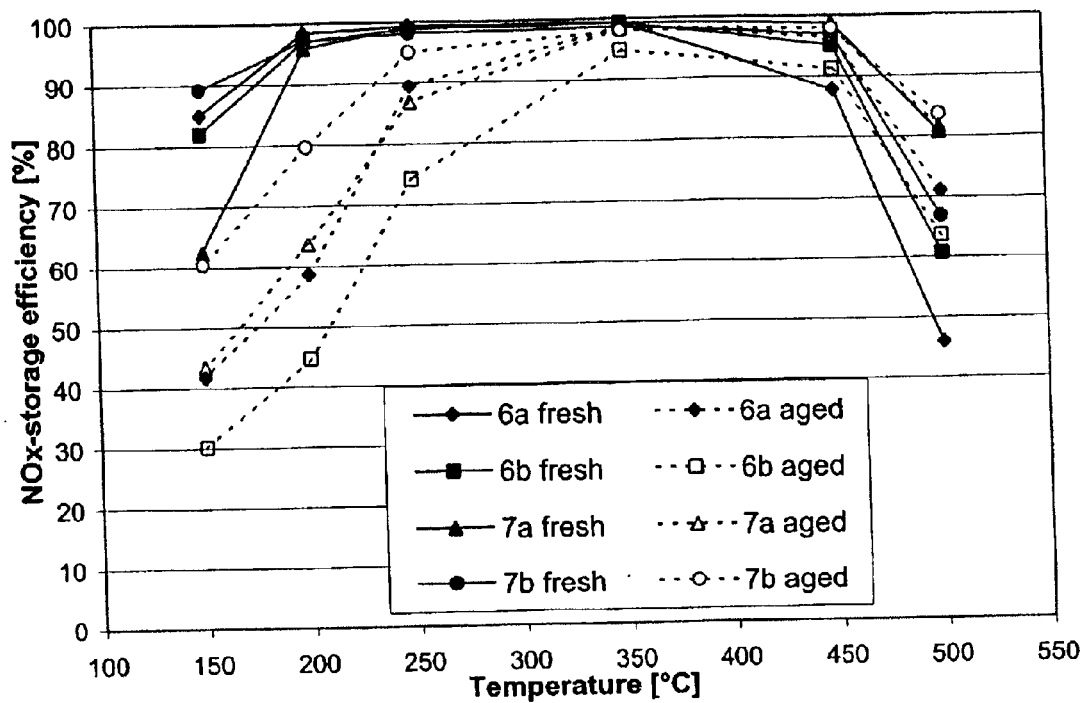
FIG. 11 illustrates the $NO_x$ storage efficiency for the catalysts of Examples 6 and 7.

FIG. 11 shows the influence of impregnation of the homogeneous Mg/Al mixed oxide with praseodymium and/or cerium. The impregnation of the homogeneous Mg/Al mixed oxide with 4 wt.-% cerium oxide results in an additional improvement of the storage efficiency.

Example 8

The Catalysts CC1 of Comparative Example 1 and C6b of Example 6 were subjected to intensified thermal ageing. For this purpose, the catalysts were stored in air for 24 hours each at temperatures of 850° C., 900° C., and 950° C.

Figure 12:
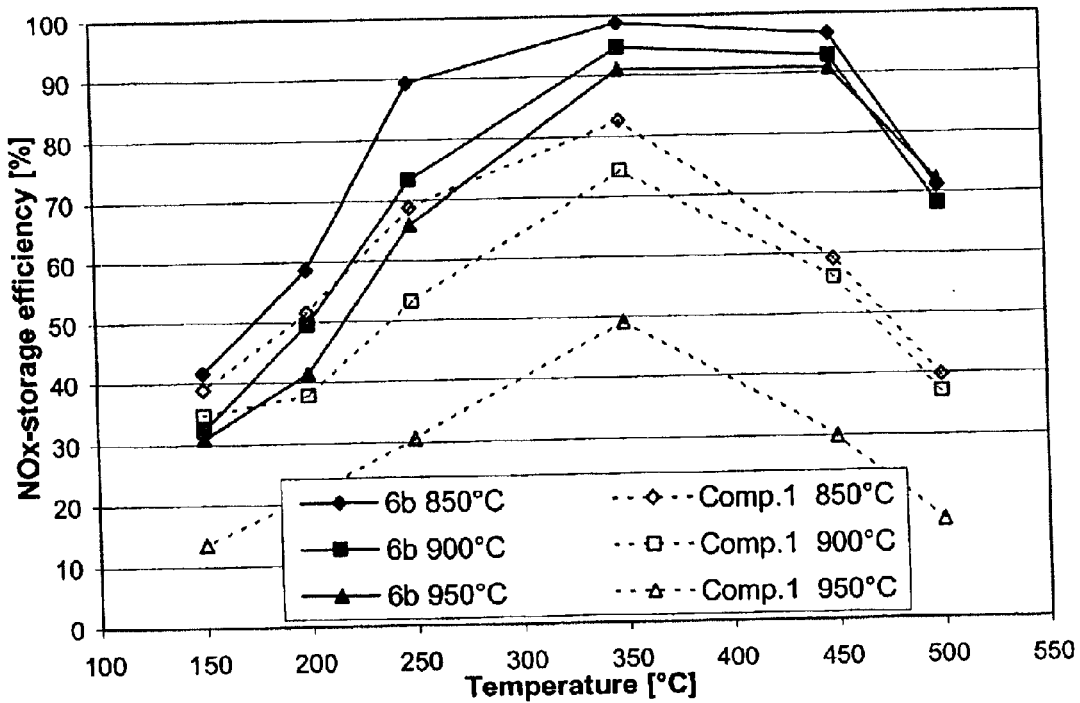
FIG. 12 illustrates the $NO_x$ storage efficiency for Catalyst 6b and Comparative Example 1 after ageing at different temperatures (850° C., 900° C. and 950° C.).

FIG. 12 shows the storage efficiencies of the catalysts after this thermal damage. After ageing at 950° C., the differences between the two catalysts are especially pronounced. After that ageing treatment, Catalyst 6b still shows a storage efficiency at an exhaust gas temperature of l 50° C. that the comparative catalyst does not approach until the exhaust gas temperature reaches 250° C. At high exhaust gas temperatures, the influence of ageing is relatively small in the inventive Catalyst C6b, while the storage efficiency of the comparative catalyst is approximately cut in half if it is aged at 950° C. instead of 850° C.

TABLE 3

Composition of the catalysts

| Coating component | Concentration [g/l] | Platinum [g/l] | Palladium [g/l] | Rhodium [g/l] |
|---|---|---|---|---|
| Comparative catalyst CC1 | | | | |
| 10La/Al$_2$O$_3$ | 123.9 | 3.18 | 1.06 | |
| 3La/Al$_2$O$_3$ | 10 | | | 0.35 |
| BaO/Ce/Zr oxide | 160 | | | |
| Comparative catalyst CC2 | | | | |
| Mg/Al mixed oxide II (20/80) | 123.9 | 3.18 | | |
| Mg/Al mixed oxide II (20/80) | 160 | | | |
| Catalyst C1a | | | | |
| Mg/Al mixed oxide II (20/80) | 123.9 | 3.18 | | |
| BaO/Ce/Zr oxide | 160 | | | |
| Catalyst C1b | | | | |
| Mg/Al mixed oxide II (20/80) | 123.9 | 3.18 | | |
| BaO/Ce/Zr oxide | 160 | | | |
| Catalyst C2a | | | | |
| Mg/Al mixed oxide II (20/80) | 123.9 | 3.18 | 1.06 | |
| BaO/Ce/Zr oxide | 160 | | | |
| Catalyst C2b | | | | |
| Mg/Al mixed oxide II (20/80) | 123.9 | 3.18 | 1.06 | |
| BaO/Ce/Zr oxide | 160 | | | |
| Catalyst C3a | | | | |
| Mg/Al mixed oxide II (20/80) | 123.9 | 3.18 | | 1.06 |
| BaO/Ce/Zr oxide | 160 | | | |
| Catalyst C3b | | | | |
| Mg/Al mixed oxide II (20/80) | 123.9 | 3.18 | | 1.06 |
| BaO/Ce/Zr oxide | 160 | | | |
| Catalyst C4a | | | | |
| Mg/Al mixed oxide II (20/80) | 123.9 | 3.18 | | |
| 3La/Al$_2$O$_3$ | 10 | | | 0.35 |
| BaO/Ce/Zr oxide | 160 | | | |
| Catalyst C4b | | | | |
| Mg/Al mixed oxide II (20/80) | 123.9 | 3.18 | 1.06 | |
| 3La/Al$_2$O$_3$ | 10 | | | 0.35 |
| BaO/Ce/Zr oxide | 160 | | | |
| Catalyst C5a | | | | |
| Mg/Al mixed oxide III (10/90) | 123.9 | 3.18 | 1.06 | |
| 3La/Al$_2$O$_3$ | 10 | | | 0.35 |
| BaO/Ce/Zr oxide | 160 | | | |
| Catalyst C5b | | | | |
| Mg/Al mixed oxide IV (5/95) | 123.9 | 3.18 | 1.06 | |
| 3La/Al$_2$O$_3$ | 10 | | | 0.35 |
| BaO/Ce/Zr oxide | 160 | | | |
| Catalyst C5c | | | | |
| Mg/Al mixed oxide I (28.2/71.8) | 123.9 | 3.18 | 1.06 | |
| 3La/Al$_2$O$_3$ | 10 | | | 0.35 |
| BaO/Ce/Zr oxide | 160 | | | |
| Comparative catalyst CC3 | | | | |
| Mg/Al oxide II (20/80) | 123.9 | 3.18 | 1.06 | |
| 3La/Al$_2$O$_3$ | 10 | | | 0.35 |
| BaO/Ce/Zr oxide | 160 | | | |
| Comparative catalyst CC4 | | | | |
| Mg/Al oxide III (10/90) | 123.9 | 3.18 | 1.06 | |
| 3La/Al$_2$O$_3$ | 10 | | | 0.35 |
| BaO/Ce/Zr oxide | 160 | | | |
| Comparative catalyst CC5 | | | | |
| Hydrotalcite; calcined (50/50) | 123.9 | 3.18 | 1.06 | |
| 3La/Al$_2$O$_3$ | 10 | | | 0.35 |
| BaO/Ce/Zr oxide | 160 | | | |
| Comparative catalyst CC6 | | | | |
| MgO + Al$_2$O$_3$ (20/80) | 123.9 | 3.18 | 1.06 | |
| 3La/Al$_2$O$_3$ | 10 | | | 0.35 |
| BaO/Ce/Zr oxide | 160 | | | |
| Catalyst C6a | | | | |
| Mg/Al mixed oxide II (20/80) + Pr$_6$O$_{11}$ | 123.9 | 3.18 | 1.06 | |
| 3La/Al$_2$O$_3$ | 10 | | | 0.35 |
| BaO/Ce/Zr oxide | 160 | | | |
| Catalyst C6b | | | | |

TABLE 3-continued

Composition of the catalysts

| Coating component | Concentration [g/l] | Platinum [g/l] | Palladium [g/l] | Rhodium [g/l] |
|---|---|---|---|---|
| Mg/Al mixed oxide II (20/80) + | 123.9 | 3.18 | 1.06 | |
| $Pr_6O_{11}$ + | 5 | | | |
| $CeO_2$ | 5 | | | |
| $3La/Al_2O_3$ | 10 | | | 0.35 |
| BaO/Ce/Zr oxide | 160 | | | |
| Catalyst C7a | | | | |
| Mg/Al mixed oxide II (20/80) + | 123.9 | 3.18 | 1.06 | |
| $CeO_2$ | 10 | | | |
| $3La/Al_2O_3$ | 10 | | | 0.35 |
| BaO/Ce/Zr oxide | 160 | | | |
| Catalyst C7b | | | | |
| Mg/Al mixed oxide II (20/80) + | 123.9 | 3.18 | 1.06 | |
| $CeO_2$ | 5 | | | |
| $3La/Al_2O_3$ | 10 | | | 0.35 |
| BaO/Ce/Zr oxide | 160 | | | |

What is claimed:

1. A catalyst for lowering the amount of nitrogen oxides in the exhaust gas from lean burn engines, comprising at least one noble metal of the platinum group and at least one nitrogen oxide storage material in combination with a homogeneous Mg/Al mixed oxide of magnesium oxide and aluminum oxide, wherein the magnesium oxide is present in a concentration of 1 to 25 wt.-%, based on the total weight of the Mg/Al mixed oxide, wherein the catalyst is disposed on a carrier in the form of a coating.

2. A catalyst according to claim 1, wherein at least one nitrogen oxide storage material comprises at least one nitrogen oxide storage component on one or more support materials.

3. A catalyst according to claim 2, wherein the nitrogen oxide storage components are oxides, carbonates or hydroxides of elements selected from the group consisting of magnesium, calcium, strontium, barium, alkali metals, rare earth metals and mixtures thereof.

4. A catalyst according to claim 3, wherein the support material for the nitrogen oxide storage components consists of one or more high-melting metal oxides.

5. A catalyst according to claim 4, wherein the high-melting metal oxides are selected from the group consisting of cerium oxide, cerium mixed oxides, aluminum oxide, magnesium oxide, a homogeneous Mg/Al mixed oxide, calcium titanate, strontium titanate, barium titanate, barium zirconate, lanthanum oxide, praseodymium oxide, samarium oxide, neodymium oxide, yttrium oxide and lanthanum manganate and mixtures thereof.

6. A catalyst according to claim 5, wherein the nitrogen oxide storage components are an oxide, carbonate or hydroxide of strontium or barium fixed on a support material of cerium oxide or cerium mixed oxides.

7. A catalyst according to claim 6, wherein the support material for the nitrogen oxide storage components is a cerium mixed oxide doped with about 0.5 to about 80 wt.-% of at least one oxide of an element selected from the group consisting of zirconium, silicon, scandium, yttrium, lanthanum and the rare earth metals and mixtures thereof, based on the total weight of the storage material.

8. A catalyst according to claim 7, wherein the support material for the nitrogen oxide storage components is a cerium/zirconium mixed oxide with a zirconium oxide content of about 1 to about 25 wt.-%, based on the total weight of the cerium/zirconium mixed oxide.

9. A catalyst according to claim 8, wherein the cerium/zirconium mixed oxide is doped with about 0.5 to about 10 wt.-% lanthanum and/or praseodymium oxide, based on the total weight of the cerium/zirconium mixed oxide and lanthanum and/or praseodymium oxide.

10. A catalyst according to claim 2, wherein the carrier is an inert ceramic or metal carrier.

11. A catalyst according to claim 1, wherein the noble metals are selected from the group selected from platinum, palladium, rhodium and mixtures thereof, and are completely or partially deposited on the Mg/Al mixed oxide.

12. A catalyst according to claim 11, wherein the surface of the Mg/Al mixed oxide is loaded with one or more rare earth oxides.

13. A catalyst according to claim 12, wherein the Mg/Al mixed oxide is loaded with praseodymium oxide and/or cerium oxide.

14. A catalyst according to claim 1, wherein the magnesium oxide is present in a concentration of about 5 to 28 wt.-%, based on the total weight of the mixed oxide.

15. A catalyst according to claim 14, wherein the magnesium oxide is present in a concentration of about 10 to 25 wt.-%, based on the total weight of the mixed oxide.

16. A catalyst according to claim 1, wherein the noble metals selected are platinum and/or palladium, which are applied on the homogeneous Mg/Al mixed oxide.

17. A catalyst according to claim 16, wherein platinum is also deposited on the nitrogen oxide storage material.

18. A catalyst according to claim 16, wherein the catalyst comprises active, optionally stabilized, aluminum oxide on which rhodium is deposited as an additional support material.

19. A catalyst according to claim 17, wherein the catalyst comprises cerium oxide or a cerium/zirconium mixed oxide on which platinum is deposited as an additional support material.

20. A catalyst according to claim 1, wherein the noble metals selected are platinum and/or rhodium, which are applied on the homogeneous Mg/Al mixed oxide.

21. A catalyst according to claim 20, wherein platinum is also deposited on the nitrogen oxide storage material.

22. A catalyst according to claim 21, wherein the catalyst comprises active, optionally stabilized, aluminum oxide on which rhodium is deposited as an additional support material.

23. A catalyst according to claims 21, wherein the catalyst comprises cerium oxide or a cerium/zirconium mixed oxide on which platinum is deposited as an additional support material.

24. A method for purifying exhaust gases from lean burn engines, comprising exposing the exhaust gases to the catalyst according to claim 1.

* * * * *